Sept. 28, 1926.
J. F. MORGAL
GROOVING TOOL
Filed Oct. 6, 1921
1,601,139
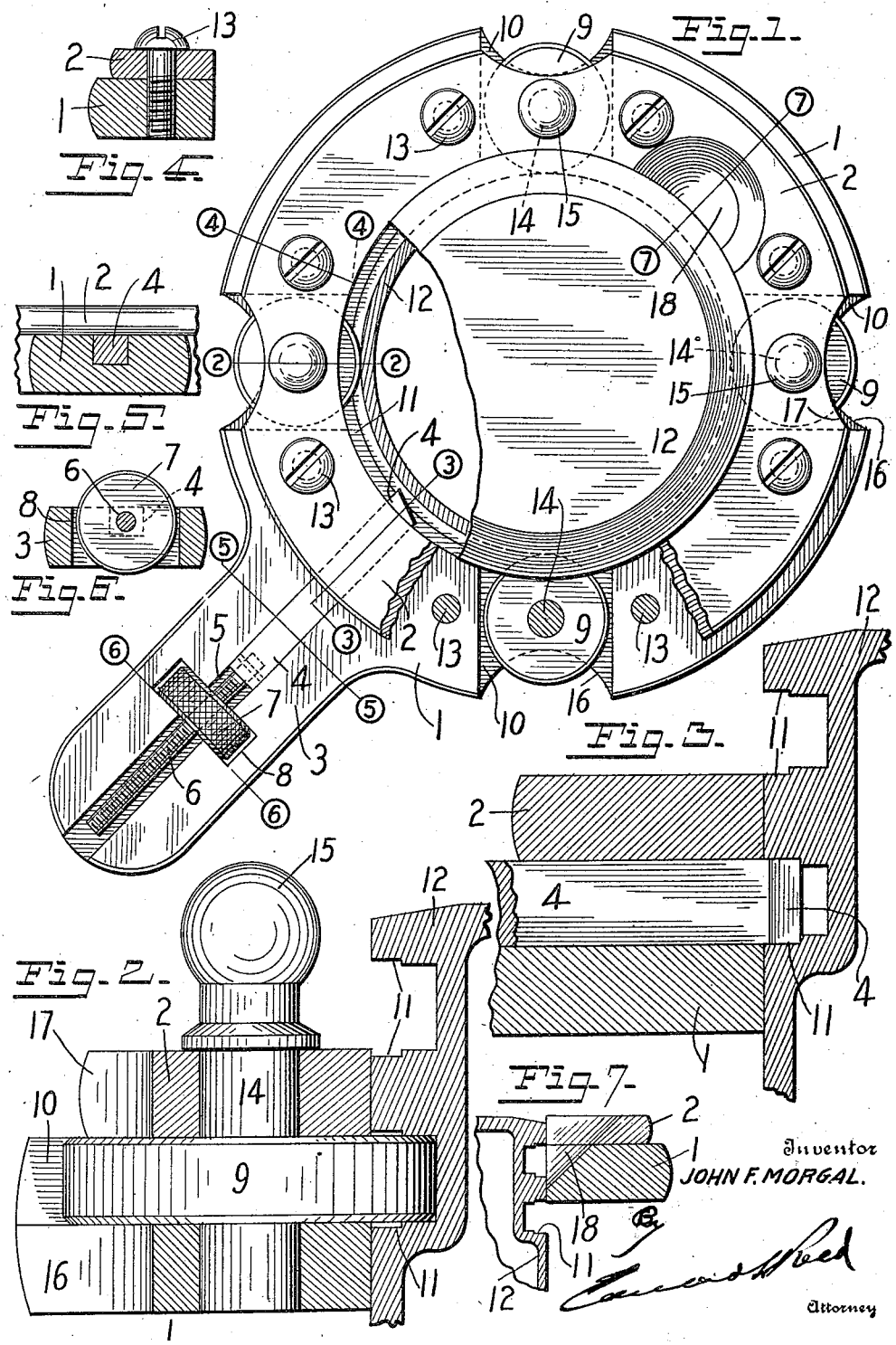
Inventor
JOHN F. MORGAL.
Attorney Patented Sept. 28, 1926.

1,601,139

UNITED STATES PATENT OFFICE.

JOHN F. MORGAL, OF SPRINGFIELD, OHIO, ASSIGNOR, BY MESNE ASSIGNMENTS, TO BERNARD E. CRABBS.

GROOVING TOOL.

Application filed October 6, 1921. Serial No. 505,750.

This invention relates to grooving tools and is designed more particularly for finishing the sides of piston rings grooves and the like.

The ring groove of a piston must have its sides parallel and must be cut in a very exact position with relation to the cylindrical surface of the cylinder. Consequently, the facing, or finishing, of the side walls of the groove is a difficult operation and as ordinarily performed requires highly skilled labor. When it is desired to renew the piston rings in a piston, it is frequently found that the old rings have battered the walls of the grooves so as to distort the same by forming shoulders therein which prevent the new rings from fitting properly, so that very frequently there is worse leakage about the rings after new rings have been inserted than there was with the old rings. New piston rings are usually inserted at commercial garages and such garages are not equipped either with the machinery or the character of labor necessary to refinish the sides of the groove so that they will properly fit a new ring.

One object of the present invention is to provide a grooving tool which can be easily operated by unskilled labor to finish the sides of a groove accurately and maintain the same in proper relation to the surface of the piston.

A further object of the invention is to provide such a tool which will be so constructed that it can not be improperly operated, thus making it practically fool proof and insuring a proper finishing of the grooves in the hands of unskilled labor.

A further object of the invention is to provide such a tool which will be very simple in its construction and of a strong, durable character.

Other objects of the invention will appear as the device is described in detail.

In the accompanying drawings Fig. 1 is a plan view, partly broken away, of a grooving tool embodying my invention and showing the same applied to a piston; Fig. 2 is an enlarged sectional view taken on the line 2—2 of Fig. 1; Fig. 3 is an enlarged sectional view taken on the line 3—3 of Fig. 1; Fig. 4 is a section taken on the line 4—4 of Fig. 1; Fig. 5 is a section taken on the line 5—5 of Fig. 1; Fig. 6 is a section taken on the line 6—6 of Fig. 1; and Fig. 7 is a section taken on the line 7—7 of Fig. 1.

In these drawings I have illustrated one embodiment of my invention and have shown the same as comprising a supporting structure or body adapted to extend about a piston, or other cylindrical structure having a circumferential groove in the external wall thereof. This structure carries a cutter adapted to enter the groove and the position of the cutter in the groove is controlled by guides which extend into the groove, preferably to a point near the base thereof so that the cutter is maintained at all times in proper relation to the side walls of the groove and, consequently, as the supporting structure is rotated about the piston the cutter will cut away the faces of the walls of the groove and thus refinish the same to an exact width with both walls parallel and with the refinished groove in a correct position with relation to the piston. While the tool is especially valuable for refinishing the grooves in old pistons, it will be understood, of course, that it may be used for finishing the grooves in the course of manufacturing the piston or for other similar purposes. It will be further understood that the particular embodiment of the invention here illustrated has been chosen for the purposes of illustration only and that the invention may take various forms without departing from the spirit thereof.

In that embodiment of the invention here illustrated the supporting structure, or body, is in the form of an annulus which extends entirely about the piston, the central opening in the structure being of sufficient diameter to permit the piston to be inserted therein. If desired for convenience of manufacture the annular supporting structure may be formed in two parts, a main lower portion 1 and an upper portion, or cap ring, 2, which is rigidly secured to the lower portion. The structure is provided with suitable means for rotating it and as the present tool is designed primarily for operation by hand I have formed integral with the main portion 1 thereof a handle 3. A cutter is mounted on the supporting structure and may be projected beyond the inner wall thereof so that it may enter the piston ring groove. This cutter may be of any suitable form, but in the present instance it is shown at 4 as a bar of tool steel having its inner end provided with cutting edges. The cutter is adjustable to enable it to be advanced into the groove as the work progresses and to that end I have slidably mounted it in a sideway, or channel 5 extending transversely to the body portion 1 of the supporting structure and lengthwise of the handle 3. The outer end of the cutter has a reduced extension which is screw threaded, as shown at 6 and a milled nut 7 is screw threaded onto this reduced portion and is rotatably mounted in a recess 8 in the handle, thus permitting the cutter to be adjusted by the thumb and finger of the hand which rotates the tool as a whole.

In order that the cutter may be maintained in proper relation to the piston ring groove at all times during the finishing operation I have provided the supporting structure with a plurality of guides which, in the present instance, are shown as rollers 9 mounted in recesses 10 in the supporting structure and rotating about axes parallel with the axis about which the tool as a whole rotates. These rollers project beyond the inner wall of the supporting structure and extend into the piston ring grooves for substantially the full depth thereof, that is, they either contact with or are arranged close to the base of the groove. The rollers are of a thickness approximately equal to the width of the original groove so that they will engage the side walls of the groove and hold the tool as a whole against movement transversely of the groove, but will permit the same to rotate about the piston, thereby guiding the cutter with relation to the groove. In the case of an old piston the grooves will, as has been explained, often be found to have shoulders formed therein by the action of the old rings, these shoulders being shown in exaggerated form at 11, Figs. 2 and 3, the piston as a whole being indicated by the reference numeral 12. It will be noted that the shoulders are spaced some distance from the base of the groove and that, therefore, the inner portion of the groove conforms to its original size and position and the rollers extending into this inner portion of the groove cause the groove to be positioned, when refinished, in exactly the same relation to the piston as was the original groove. The cutter 4 preferably extends above and below the planes of the upper and lower surfaces of the rollers, respectively, so that it will simultaneously cut both the upper and lower sides of the groove. Consequently, the side walls of the groove are absolutely parallel and because of the action of the guides each side of the groove will lie in exactly the same plane throughout the circumference of the groove, and, further, the tool being held against any tilting movement the groove will be at right angles to the axis of the piston. In order that the tool may be placed on and removed from the piston the guide rollers are removably mounted in the recesses 10. As here shown, the recesses are formed wholly in the lower, or body, portion of the supporting structure and the upper sides are closed by the upper portion, or cap ring, 2 which is rigidly secured to the lower portion by screws 13, there being preferably one of these screws on each side of each roller. The rollers are secured in position within the recesses by means of removable pins 14 which extend through both parts of the supporting structure and through the roller, these pins being preferably provided with heads 15 to facilitate their removal. It will be apparent that by removing the pins the rollers may be slipped outwardly, the structure placed about a piston, and the rollers then inserted in the groove and the pins replaced. It will be understood, of course, that the cutter is retracted until after the tool has been placed in position and then adjusted to bring the cutting edges thereof in contact with the walls of the groove. After the groove has been completely refinished the pins are again withdrawn and the rollers removed to permit the tool either to be shifted to a new groove in the same piston or to be removed from the piston. To facilitate the withdrawal of the rollers from the grooves the lower and upper members of this structure are provided in their outer edges, adjacent to the recesses 10, with recesses 16 and 17 which enable the rollers to be grasped between the fingers and drawn outwardly. I have also shown the structure as a whole as provided in its inner edge with a recess 18 which extends to a point below the level of the groove and enables the operator to inspect the groove from time to time to note progress of the work.

The supporting structure of the tool may, if desired, fit closely about the piston to which it is applied but this is not necessary and it is wholly practical to utilize one tool for several pistons of different diameters, it being only necessary to provide a different set of guide rollers for each size of piston. The guide rollers being mounted on fixed axes will, if of the proper diameter, support the tool in proper relation to the piston regardless of whether or not the supporting structure itself comes in contact with the piston.

The operation of the device will be readily understood from the foregoing description and it will be apparent that the construction of the device is such that it can be applied to the piston in one way only and that after it is applied to the piston its operation is automatically controlled so that the refinishing of the groove is necessarily properly accomplished, thus enabling efficient work to be accomplished by an unskilled workman.

Further, it will be apparent that the tool renders unnecessary the placing of the piston in a lathe and accurately centering the same, as must be done when the rings are refinished on a lathe and, that it is not even necessary that the piston rod should be removed from the piston but this may be gripped in a vise and the piston secured in a rigid position and the tool applied thereto. The work is quickly and accurately accomplished. The cutter itself is of a strong, rigid character and may be easily sharpened or replaced.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a tool of the character described, a supporting structure adapted to extend about the exterior of a cylindrical body having a circumferential groove, the outer portion of which has been distorted, a cutter carried by said structure and arranged to enter said groove, and a plurality of guides carried by said structure, arranged to travel in the inner undistorted portion of said groove and so spaced with relation to said structure that they will support said structure and said cutter in the plane of said groove.

2. In a tool of the character described, a supporting structure adapted to extend about the exterior of a cylindrical body and having a circumferential groove, the outer portion of which has been distorted, a cutter carried by said structure and arranged to enter said groove, and guides carried by said structure and arranged to travel in said groove in contact with both side walls of the inner undistorted portion thereof and to thereby cause said cutter to travel in the plane of said groove.

3. In a tool of the character described, a one-piece annular structure adapted to be placed about a cylindrical body having a circumferential groove, the outer portion of which has been distorted, a cutter carried by said structure and arranged to enter said groove, and guide rollers mounted on said structure in fixed alinement one with the other and arranged to travel in the inner undistorted portion of said groove and to thereby support said structure in the plane of said grooves.

4. In a tool of the character described, a supporting structure adapted to extend about a cylindrical body having a circumferential groove the outer portion of which has been distorted, means for rotating said structure about said body, a cutter carried by said structure and arranged to enter said groove, means for adjusting said cutter radially to said structure, and guide rollers carried by said structure and arranged to travel in said groove in contact with both side walls of the inner undistorted portion thereof and to thereby cause said cutter to travel in a plane perpendicular to the axis of said cylindrical body.

5. In a tool of the character described, a supporting structure adapted to extend about a cylindrical body and having a circumferential groove the outer portion of which has been distorted, a cutter carried by said structure and arranged to enter said groove, said cutter having cutting edges to act simultaneously on both sides of said groove, and guides carried by said structure and arranged to travel in said groove in contact with both side walls of the inner undistorted portion thereof and to cause said cutter to travel in a plane perpendicular to the axis of said cylindrical body.

6. In a tool of the character described, a supporting structure adapted to extend about a cylindrical body having a circumferential groove, a cutter carried by said structure and arranged to enter said groove, guides carried by said structure and arranged to travel in said groove and support said cutter in operative engagement with both walls thereof, and maintain the same in the plane of said groove, means for rotating said structure about said cylindrical body, and means for advancing said cutter into said groove after each rotation of the supporting structure.

7. In a tool of the character described, a one piece annular structure adapted to extend entirely about a cylindrical body having a circumferential groove, a cutter carried by said structure and adapted to operatively engage the walls of said groove, guides carried by said structure and arranged to travel in said groove and to support said cutter in a plane perpendicular to the axis of said cylindrical body, said guides being movably mounted on said annular structure to permit them to be inserted in or withdrawn from said groove when said annular structure is in position on said cylindrical body, and means for rotating said structure about said cylindrical body.

8. In a tool of the character described, an annular supporting structure adapted to extend entirely about the exterior of a cylindrical body having a circumferential groove, a cutter carried by said structure and adapted to extend into said groove and to simultaneously act upon both walls of said groove, a plurality of rollers mounted on said structure and adapted to extend into said groove for substantially the full depth thereof to control the position of said cuter with relation thereto, said rollers being capable of bodily movement relative to said structure to permit said structure to be placed about said cylindrical body, and means for rotating said structure around said cylindrical body.

9. In a tool of the character described, an annular supporting structure adapted to extend entirely about a cylindrical body having a circumferential groove, a cutter adjustably mounted on said structure and arranged to be moved into and out of said groove, said cutter having cutting edges to engage both of the walls of said groove, recesses formed in said supporting structure, rollers mounted in said recesses and extending beyond the wall of said structure into said groove, and means to rotate said structure.

10. In a tool of the character described, an annular supporting structure adapted to extend about a cylindrical body having a circumferential groove, a cutter carried by said structure and arranged to enter said groove, said structure having a plurality of recesses therein, a roller mounted in each of said recesses and projecting beyond the inner wall of said structure, each roller being of such a diameter that it will extend into said groove for substantially the full depth thereof, and means for rotating said structure.

11. In a tool of the character described, a supporting structure adapted to extend about a cylindrical body having a circumferential groove, said structure having a plurality of recesses therein, a cutter mounted on said structure and arranged to enter said groove, rollers mounted in the respective recesses, and arranged to travel in said groove, means for removably securing said rollers in said recesses, and means for rotating said structure.

12. In a tool of the character described, a supporting structure adapted to extend about a cylindrical body having a circumferential groove, said structure being provided with a handle and having recesses therein, a guideway formed in said structure and said handle, a cutter adjustably mounted in said guideway, means for moving said cutter into and out of said groove, rollers mounted in the respective recesses in said structure and arranged to travel in said groove to control the position of said cutter with relation to the walls of said groove, and means for removably securing said rollers in said recesses.

13. In a tool of the character described, an annular supporting structure adapted to extend about a cylindrical body having a circumferential groove, said structure having recesses opening through the inner wall thereof between its upper and lower edges, rollers mounted in said recesses and arranged to travel in said groove, a cutter carried by said structure and arranged to enter said groove, and means for rotating said annular structure, said annular structure having a recess in the inner wall thereof extending from the upper surface of said structure to a point below said groove, whereby the progress of the work may be inspected.

In testimony whereof, I affix my signature hereto.

JOHN F. MORGAL.